J. H. NEAL.
SAFETY DEVICE FOR AUTOMOBILES.
APPLICATION FILED FEB. 24, 1916.

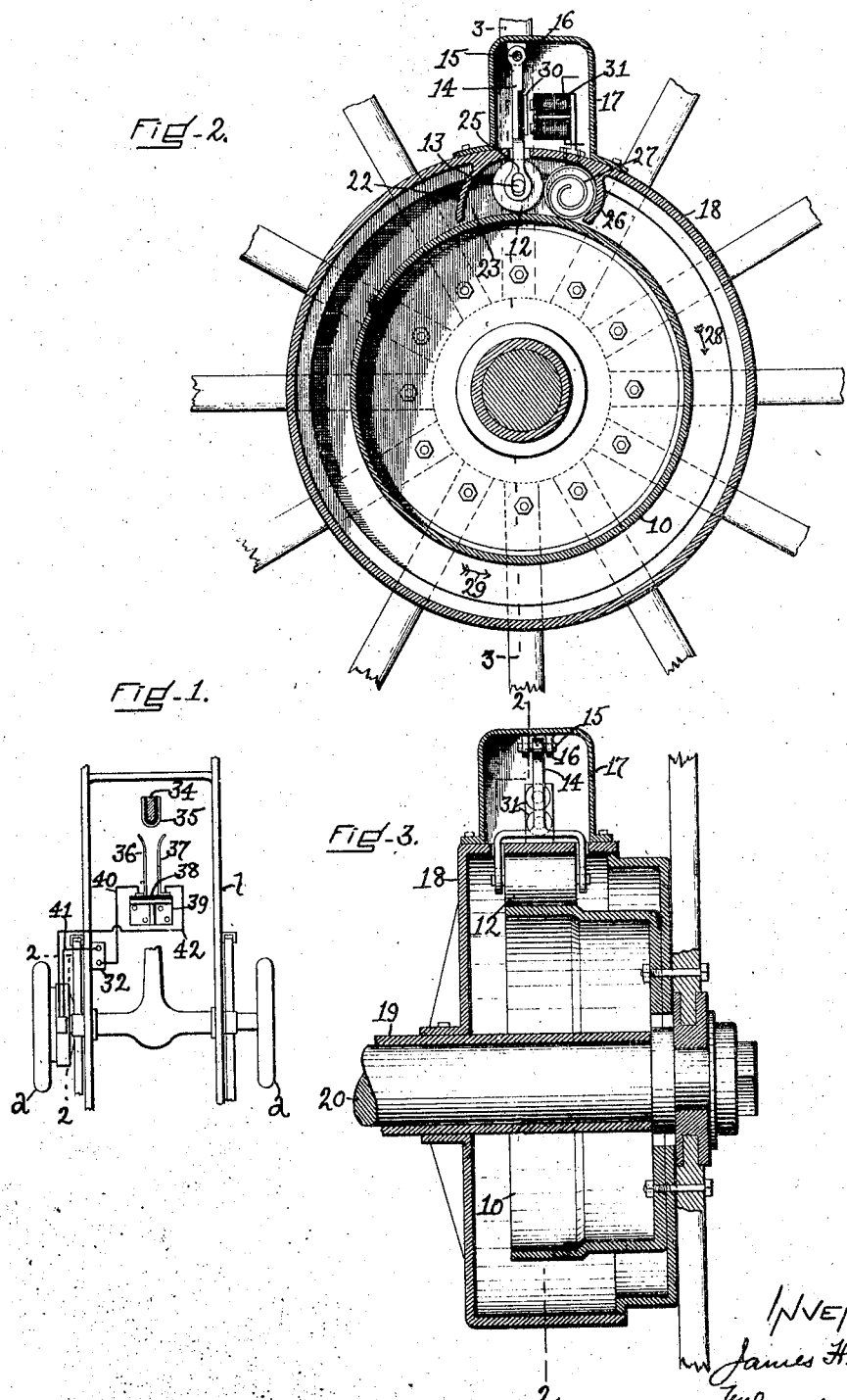

1,200,751.

Patented Oct. 10, 1916.
3 SHEETS—SHEET 2.

INVENTOR=
James H. Neal

J. H. NEAL.
SAFETY DEVICE FOR AUTOMOBILES.
APPLICATION FILED FEB. 24, 1916.
1,200,751.
Patented Oct. 10, 1916.
3 SHEETS—SHEET 3.
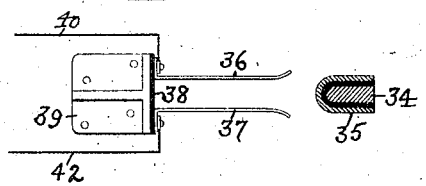
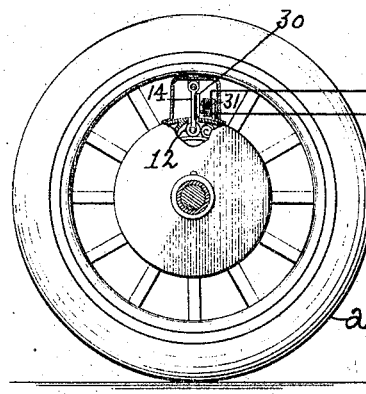
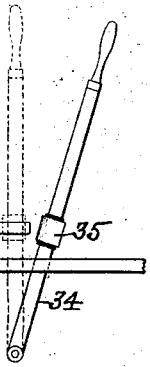
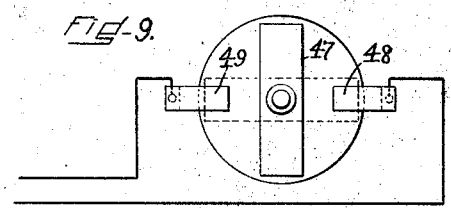
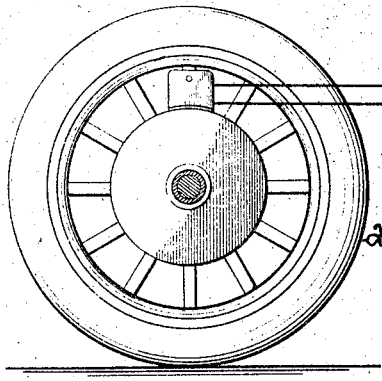
INVENTOR
James H. Neal
By Jas. H. Churchill
Atty.

UNITED STATES PATENT OFFICE.

JAMES H. NEAL, OF CAMBRIDGE, MASSACHUSETTS.

SAFETY DEVICE FOR AUTOMOBILES.

1,200,751.   Specification of Letters Patent.   Patented Oct. 10, 1916.

Application filed February 24, 1916. Serial No. 80,273.

*To all whom it may concern:*

Be it known that I, JAMES H. NEAL, a citizen of the United States, and a resident of Cambridge, in the county of Middlesex and State of Massachusetts, have invented an Improvement in Safety Devices for Automobiles, of which the following description, in connection with the accompanying drawings, is a specification, like characters on the drawings representing like parts.

This invention relates to a safety device for automobiles and like vehicles, and is of that character in which a locking device is automatically brought into action when the vehicle is unexpectedly moved backward.

The present invention has for its object to provide a simple and efficient mechanism for rendering said locking device inoperative when it is desired to reverse the vehicle, and to this end I have provided electromagnetic means for moving the locking device into an inoperative position when it is desired to reverse the vehicle, which electromagnetic means is connected in circuit with a suitable current generator carried by the vehicle. The circuit referred to is normally open to render the electromagnetic means normally inoperative upon the locking device, and said circuit is provided with a switch or circuit controller having its movable member operatively connected with the controlling mechanism for the vehicle, so that movement of the controlling mechanism for the vehicle to effect reversal of the latter automatically closes said circuit and energizes the electromagnetic means to render the locking device inoperative, and thereby permit the vehicle to be reversed, and so that the movement of the said controlling mechanism to bring the vehicle to a stop or to effect its forward movement automatically opens said circuit and renders the locking device again operative to arrest unexpected reverse movement of the vehicle.

Figure 4:
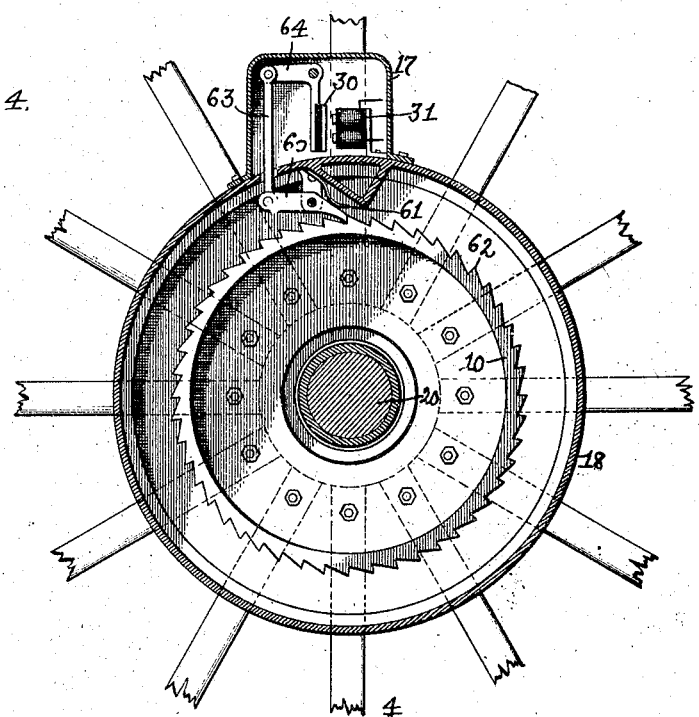
Figure 5:
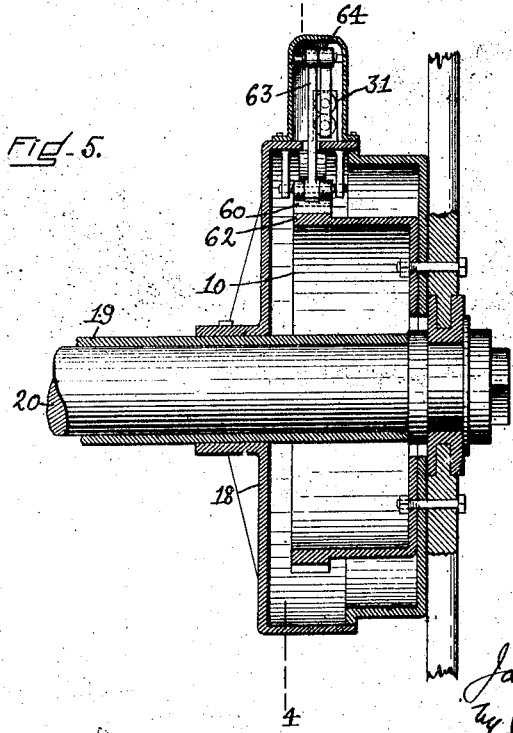

Figure 1 represents in plan and on an enlarged scale a sufficient portion of the chassis of a motor vehicle provided with an electromagnetically controlled safety device in accordance with this invention. Fig. 2, a section on an enlarged scale on the line 2—2, Figs. 1 and 3. Fig. 3, a vertical section on the line 3—3, Fig. 2, with the axle in elevation. Figs. 4 and 5, sections like Figs. 2 and 3, showing a modified form of safety device, Fig. 4, being a section on the line 4—4, Fig. 5. Fig. 6, a detail of one form of circuit controller. Fig. 7, a diagrammatic view to illustrate the connection of circuit controller with one form of control mechanism for the vehicle. Fig. 8, a diagrammatic view illustrating the connection of the circuit controller with another form of control mechanism, and Fig. 9, an underside view of the circuit controller shown in Fig. 8.

In the present instance, I have illustrated the safety device as applied to one of the rear wheels $a$ of an automobile $b$ of known construction and which may be a gasolene-driven vehicle or electrically-driven or both.

In Figs. 2 and 3, I have shown one form or construction of safety device, and in Figs. 3 and 4, another form, both of which are electromagnetically controlled as will be described.

The safety device consists essentially of a rotatable member and a holding or locking member therefor.

In Figs. 2 and 3, the rotatable member is shown as a drum 10, which is secured to one and if desired to both of the wheels $a$, and the locking member is shown as a roll 12 mounted to turn freely on a pin 13 carried by a forked lever 14, which is pivoted at 15 to ears 16 on a casing 17, attached to a stationary drum 18, which may be riveted or otherwise secured to the housing 19 for the rear axle 20.

The stationary drum 18 is of larger diameter than the rotatable member 10 and is provided on its underside with lug or arm 22, which forms with the rim of the drum 10 a wedge-shaped or contracted space 23 (see Fig. 3) between the rims of said drums, which space is of the full diameter of the roll 12 at one end and diminishes toward the other end, so that, when the roll 12 is moved into the space 23, which it is permitted to do by providing for vertical play between the pin 13 and the lever 14, it becomes wedged between the drums and locks the rotatable drum 10 to the stationary drum 18 and thereby prevents the drum 10 from rotating, consequently locking the wheels $a$ from rotating in a reverse direction. The vertical play between the pin 13 and lever 14 is accomplished as shown by providing suitable slots 25 in the lever 14 into which the pin 13 extends.

The rim of the stationary drum 18 may be provided with a second arm 26 on the opposite side of the roll 12, to serve as a back stop for a spring 27, which normally keeps the roll 12 in its central or normal position, and when the roll 12 is in its central position, the drum 10 is capable of being turned freely in the direction of the arrow 28, Fig. 2. If, however, the roll 12 is moved into the contracted space 23, which is effected by rotation of the drum 10 under abnormal conditions, as, for instance, by the vehicle backing down a steep grade, while the transmitting mechanism is in neutral or in a forward position and the usual brakes fail to hold the vehicle, the roll 12 is wedged in the space 23 by the rotation of the drum 10 in the reverse direction indicated by the arrow 29, and prevents continued rotation of the drum 10 in the reverse direction, thereby bringing the vehicle to rest and avoiding accidents.

Provision is made for electromagnetically rendering the rotatable member 10 ineffective upon the roll 12 by reverse rotation of the said member, and to effect this result automatically when the controlling device for the vehicle is moved to effect reverse movement of the vehicle. To this end, the lever 14 has attached to it the armature 30 of an electromagnet 31 located in the casing 17 and supported as herein shown upon the stationary member or drum 18.

The electromagnet 31 is connected in circuit with a suitable current generator carried by the vehicle, which may be a battery 32 as represented in Fig. 7 or a small dynamo 33 as represented in Fig. 8. The circuit referred to is provided with a circuit controller or switch, which has its movable member operatively connected with the controlling device for the vehicle, so that, when the said controlling device is moved to reverse the vehicle, the circuit of the electromagnet 31 will be automatically closed by said movement of the controlling device.

In Figs. 1 and 7, is represented a lever 34, which is and may be such as is employed on automobiles provided with gasolene motors and which is conventionally illustrated in the present instance, but which in practice may be of the selective or progressive type employed to control the direction of movement of the vehicle. The lever 34 has attached to it the movable member 35 of a circuit controller, which latter may be of any suitable construction and which is represented as of the knife blade type, it being provided with contact members 36, 37, secured to a base 38 of insulating material, which is fastened to a suitable support 39, the contact members 36, 37, being arranged with relation to the control lever 34 so as to be engaged by the movable member 35 when the control lever 34 is moved to effect reverse movement of the vehicle. As represented in Figs. 1 and 7, one contact member as 36 is connected by wire 40 with the positive pole of the battery 32, which has its negative pole connected by wire 41 to one end of the coil of the electromagnet 31, the other end of said coil being connected by wire 42 with the contact member 37. It will thus be seen, that when the driver of the vehicle moves the control lever 34 so as to reverse the vehicle, which position is represented by dotted lines, the movable member 35 of the circuit controller is engaged with the contact members 36, 37, and the circuit of the electromagnet 31 is closed, thereby energizing the said electromagnet, which attracts its armature 30 and the lever 14, and holds the roll 12 from being moved by the drum 10 into the contracted space 23, thereby rendering the locking device ineffective to prevent reversal of the vehicle at the will of the operator. When, however, the control lever 34 is moved to neutral or into a forward position, as represented by full lines in Fig. 7, the circuit of the electromagnet 31 is opened and the roll 12 is then free to respond to the unexpected reverse rotation of the drum 10.

In Fig. 8, the circuit of the electromagnet is represented as supplied with current from a generator of the dynamo type and the control lever is represented as a handle 45 on a shaft 46 similar to the controller of an electric car, or such as is now employed in electrically propelled automobiles. In the present instance, the shaft 46 has fast on it the movable member 47 of a circuit controller, which is provided with contact members 48, 49, with which the member 47 coöperates. The circuit controller 47, 48, 49, is arranged so that the movable member 47 is brought into engagement with the members 48, 49, only when the control lever 45 is turned into position to reverse the vehicle, which latter may be a vehicle provided with an electric motor alone or in combination with a gasolene motor, and the generator 33, which supplies the electromagnet with current, may be a separate installation on the vehicle or the circuit of the electromagnet may be in shunt with the motor employed on gasolene driven vehicles for the self starter, etc. The circuit of the electromagnet 31 may be traced in Fig. 8, from the positive brush as 50 of the generator 33 by wire 51 to the electromagnet, thence by wire 52 to the terminal 48 of the switch, thence by contact member 47 to switch terminal 49 and thence by wire 53 to the negative brush 54.

In Fig. 9, the switch member 47 is shown in its open position by full lines and in its closed position by dotted lines.

In Figs. 2 and 3, the electromagnet 31 is shown as associated with one form of locking device, which may be preferred but it is not desired to limit the invention in this respect, as the said electromagnet may be used with other forms of locking device as represented in Figs. 4 and 5, wherein the locking device is shown as a pawl 60 pivotally mounted on the stationary drum 18 and adapted to have one end engaged by a spring 61 or by gravity alone with ratchet teeth 62 on the circumference of the rotatable drum 10, and having its other end connected by a link 63 with an elbow lever 64 located in the casing 17 and carrying the armature 30 of the electromagnet 31.

By reference to Fig. 4, it will be observed that when the electromagnet 31 is energized, its armature is attracted and the lever 64 is rocked so as to move the link 63 downward, and thereby turn the pawl 60 on its pivot so as to disengage it from the ratchet drum, which leaves the latter free to be reversed.

From the above description, it will be seen that there is provided a very simple, inexpensive and highly efficient means for automatically rendering the holding device inoperative by the act of reversing the vehicle, which apparatus can be applied with little trouble and at a minimum cost to motor vehicles.

Claims.

1. The combination with a motor vehicle provided with wheels and with a device for controlling movement of said vehicle, of a safety device rendered effective by reverse movement of said vehicle to prevent continued movement in the reverse direction, an electromagnet, a connection between said electromagnet and said safety device, an electric circuit in which said electromagnet is included, a current generator for said circuit carried by said vehicle, and a circuit controller for said circuit coöperating with said controlling device to be actuated thereby to close said circuit and energize said electromagnet and render said safety device inoperative when the said vehicle controlling device is operated to reverse the vehicle.

2. The combination with a motor vehicle provided with wheels and with a device for controlling movement of said vehicle, of a locking device coöperating with a member rotatable with a wheel of the vehicle to arrest reverse rotation of said vehicle, an electromagnet located in proximity to said locking device and having its armature operatively connected with said locking device to render the latter inoperative when said magnet is energized, and a circuit controller governing the energizing of said magnet and rendered effective to energize said magnet when said vehicle controlling device is operated to reverse the vehicle.

3. The combination with a motor vehicle provided with wheels, of a locking device for preventing unexpected reverse movement of said vehicle, an electromagnet carried by said vehicle and located in proximity to the locking device and having its armature operatively connected with said locking device, and a circuit controller governing the operation of said electromagnet to cause the latter to render said locking device inoperative when it is desired to reverse the vehicle.

4. The combination with a motor vehicle provided with wheels and with a device for controlling movement of said vehicle, of a locking device for preventing unexpected reverse movement of said vehicle, an electromagnet located in proximity to said locking device, a connection between said electromagnet and said locking device for rendering the latter inoperative and a circuit controller for said electromagnet rendered effective by said controlling device.

In testimony whereof, I have signed my name to this specification.

JAMES H. NEAL.